United States Patent [19]

Schwartzman

[11] Patent Number: 4,766,669

[45] Date of Patent: Aug. 30, 1988

[54] STRIPPING METHOD AND APPARATUS FOR COAXIAL CABLE

[75] Inventor: Benjamin Schwartzman, Hagerstown, Md.

[73] Assignee: AMP Incorporated, Harrisburgh, Pa.

[21] Appl. No.: 944,779

[22] Filed: Dec. 22, 1986

[51] Int. Cl.[4] .............................................. H02G 1/12
[52] U.S. Cl. ..................................... 29/828; 29/364.4; 29/867; 81/9.4; 81/9.51
[58] Field of Search ...................... 29/564.4, 828, 867; 81/9.4, 9.41–9.44, 9.51

[56] References Cited

U.S. PATENT DOCUMENTS

| | | | |
|---|---|---|---|
| 2,786,095 | 3/1957 | Arbeiter | 29/828 X |
| 2,988,940 | 6/1961 | Folkenroth et al. | |
| 3,191,464 | 6/1965 | Demler | |
| 3,254,407 | 6/1966 | Apa et al. | |
| 3,344,691 | 10/1967 | Staggs | 81/9.42 |
| 3,484,936 | 12/1969 | Schwalm et al. | |
| 3,486,216 | 12/1969 | Cimolino | 81/9.41 X |
| 3,567,846 | 3/1971 | Brorein | 29/828 X |
| 3,577,814 | 5/1971 | Hammond | |
| 3,931,672 | 1/1976 | Siden | 29/867 |
| 4,203,333 | 5/1980 | Campari | |

OTHER PUBLICATIONS

AMP Special Tooling, PM 5182, Rev F, Feb. 1984, pp. IV/3, IV/4, IV/9 IV/10.
AMP Coaxial Cable Stripping Machine No. 253326-1, CM 2365 Rev. F, Jan. 1985, pp. 1 and 2.
AMP Semi-Rigid Cable Stripping Machine No. 220211-2, CM 5599, Jan. 1984, pp. ii, iii, iv.
AMP Tooling Product Bulletin 1001-15, "Coaxial Cable Stripper", 1979.
AMP Product Information Bulletin, "Coaxial Cable Stripping Machine", Data Sheet No. 406-1, Rev. 2/73.

Primary Examiner—Carl E. Hall
Assistant Examiner—Taylor J. Ross
Attorney, Agent, or Firm—William B. Noll

[57] ABSTRACT

Stripping of the outer jacket of miniaturized coaxial cable is achieved through the use of stripping blades which have surfaces dulled to preclude cutting the cable core or ground conductor and yet sever the cable and metalized film from the cable core. The stripping blades have an offset to eliminate the need to orient the cable relative to the ground wire with the dull surfaces having a radius to substantially deform the cable with the cable then being pulled to effect removal of the outer jacket and metallized film. The length of stripping accommodates axial elongation of the core with excess core subsequently being trimmed, thereby resulting in a desired stripped length.

5 Claims, 3 Drawing Sheets

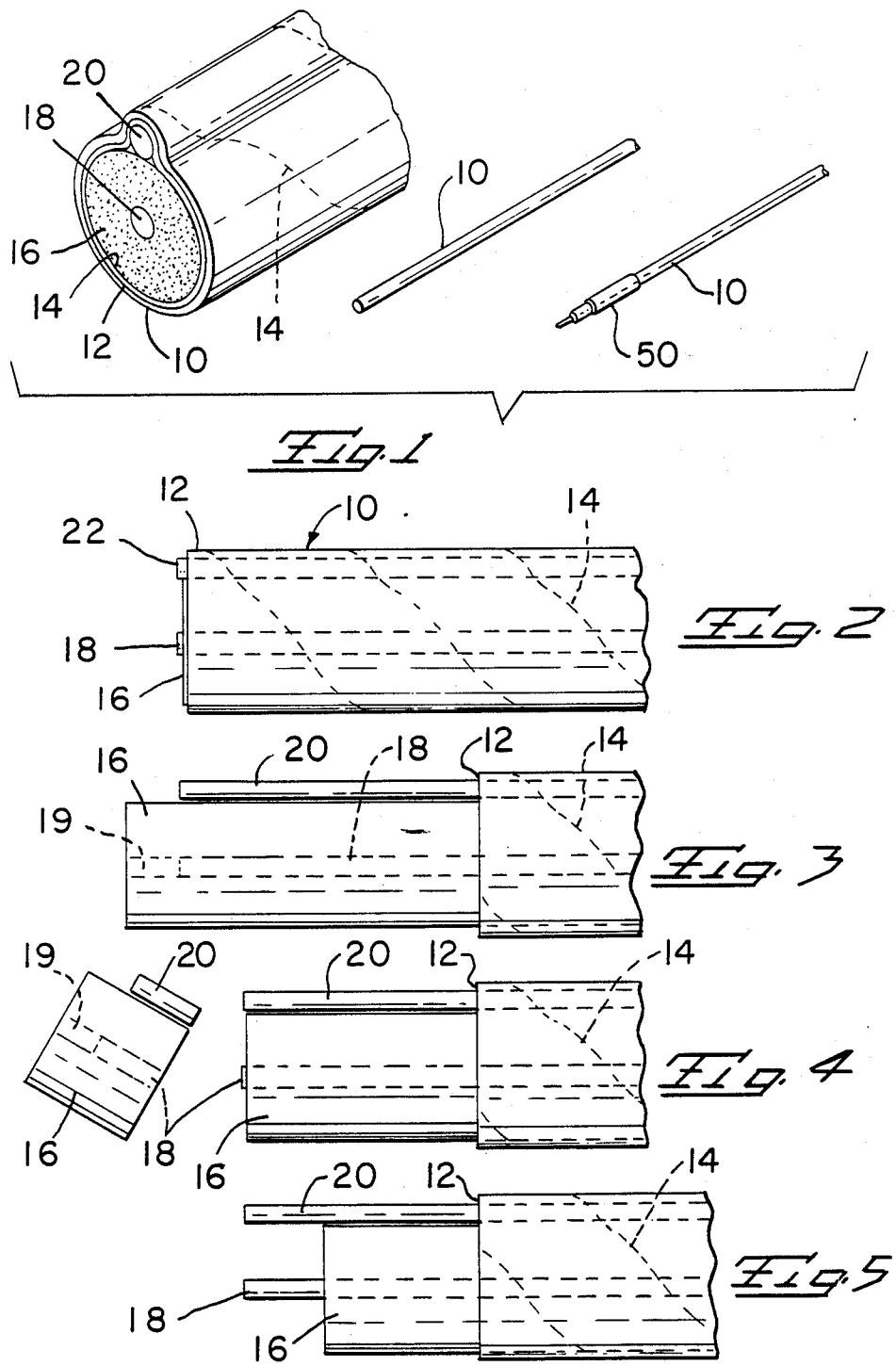

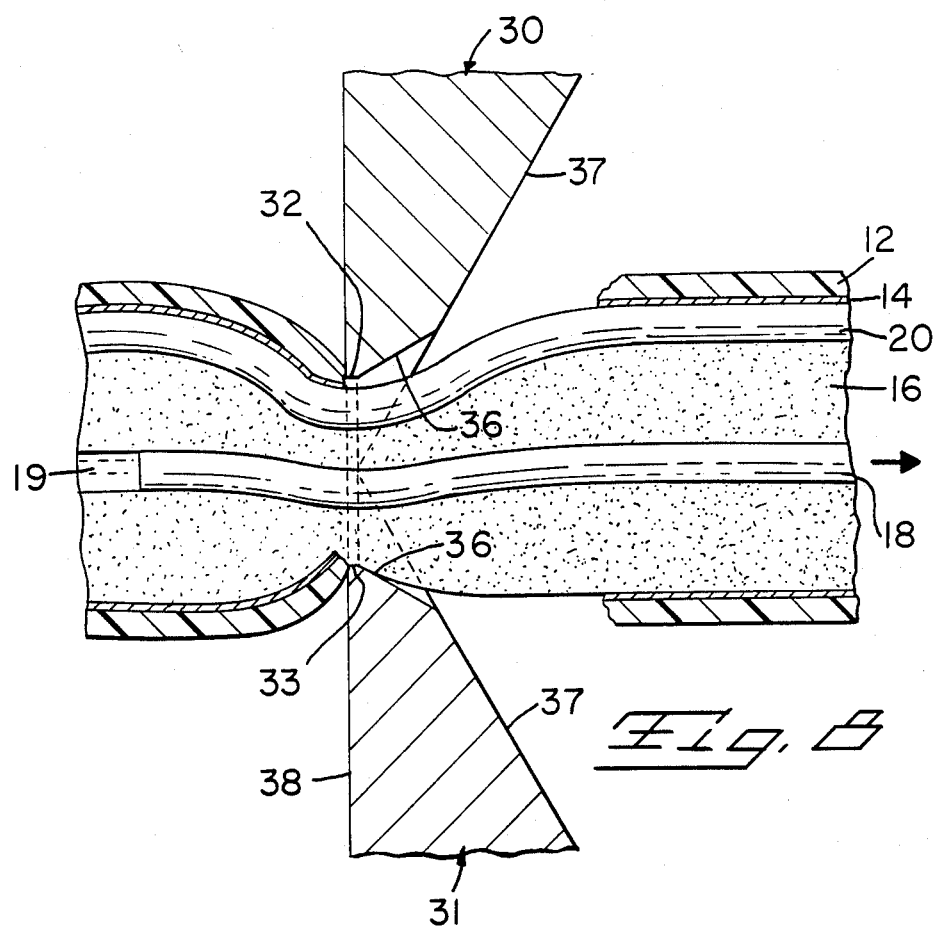
Fig. 8
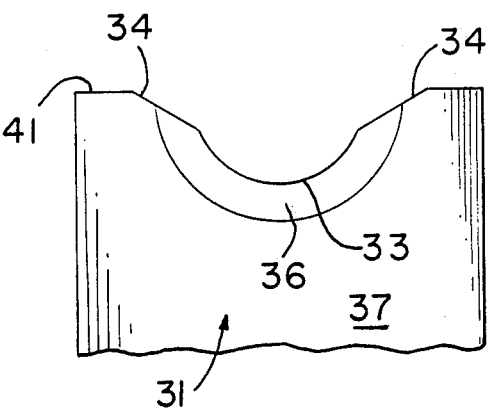
Fig. 9
Fig. 10

STRIPPING METHOD AND APPARATUS FOR COAXIAL CABLE

The present invention relates to a method and apparatus for stripping soft core signal transmission calbe preparatory to termination of such cable by appropriate coaxial connectors. The method deals with manipulation of such cable relative to stripping blades of a novel configuration which permit such stripping without damage to the constituents of the cable.

BACKGROUND OF THE INVENTION

A widely ised miniaturized coaxial cable made to have characteristics to allow signal transmission to propagate at high speeds includes a foamed dielectric core which is of necessity, for electrical reasons, as close to air as possible in terms of dielectric constant and velocity of propagation. This is accomplished by foaming or injecting air or causing air to be entrapped in a matrix of plastic materials such as Teflon or polyolefin or other low dielectric constant materials. As a direct result, the dielectric core material has little structural strength, is easily deformed and damaged, and is both delicate and fragile. In typical cable constructions, this core is extruded or wrapped around a signal conductor with a drain or ground wire laid thereover and that assembly wrapped or covered with a metallized plastic film or foil which in turn is covered with an outer protective jacket. The foam core supports the signal conductor through its center, and the ground wire, foil and outer jacket are coaxially positioned therearound.

In order to terminate such cable to appropriate coaxial connectors, the cable must be stripped so as to expose the signal and ground conductors for manipulation and termination to the signal and ground elements of a given connector. Stripping of such cable has proven to be difficult due to the fact that the foam core offers no backup against which stripping blades can be applied with the result that the outer jacket and foil are not adequately penetrated, in turn resulting in ripping or displacements and in general, very unsatisfactory stripping. Alternatively, with sufficiently sharp stripping blades and pressure in accordance with prior art practice, the outer jacket and foam may be severed, but frequently the ground wire which rests beneath the foil is also severed or worse yet, nicked, so that it may fail during manipulation and use thereafter. Additionally, prior efforts have required a precision orientation of the cable ground wire relative to stripping blades.

SUMMARY OF THE INVENTION

Method and apparatus for stripping miniature coaxial cable preparatory to termination thereof with miniaturized coaxial connectors is disclosed for use with cable that has a foamed, dielectric core. The invention apparatus employs stripping blades which are closed to surround and to deform the cable to a considerable extent in a clamping and pinching relationship thereto. The blades are made to have leading edges which are dulled to prevent the cutting or nicking of the cable ground conductor and a tapered edge relief to preclude the need to orient the cable ground wire. With the blades closed against the jacket, the cable is axially displaced or pulled resulting in that portion of the jacket including the outer sheet and the foil being removed from the foam core. This step of the method results in the foam core being stretched and displaced in such a fashion that trimming is unnecessary to ensure a proper length of the stripped elements of the cable. Thereafter, the application of heat to the foam has been found to cause it to retract, thus exposing the signal conductor for subsequent manipulation and termination to a coaxial connector. The primary object of the invention is to provide an improved method of stripping coaxial cable and means therefor in the form of stripping blades of a new shape.

BRIEF DESCRIPTION OF THE DRAWINGS

FIG. 1 is a perspective view, showing on the lefthand a high-speed signal transmission cable much enlarged relative to, on the immediate right, a cable roughly of actual dimension, and further to the right, a cable terminated by a coaxial connector of more or less actual dimension.

FIGS. 2-5 are side views of the cable of FIG. 1, the enlarged version thereof, revealing the invention method from initial cable condition to final preparation.

FIG. 8 is a view of the elements of FIG. 7 with the cable being withdrawn to effect the first phase of the stripping operation.

FIG. 9 is a part cross-sectional view of a bottom stripping blade.

FIG. 10 is a front elevational view of the stripping blade of FIG. 9.

DETAILED DESCRIPTION OF THE INVENTION

Figure 6:
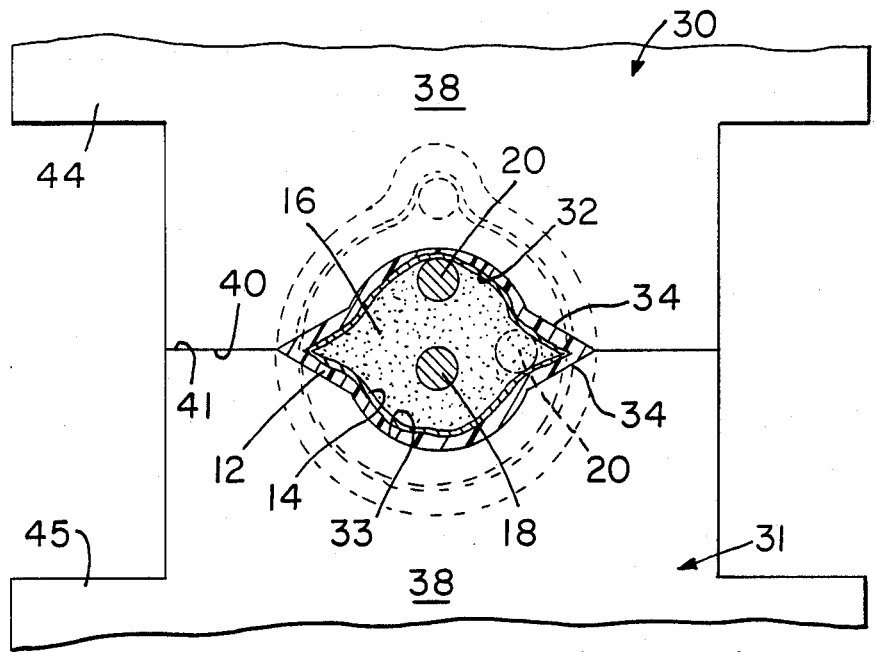
FIG. 6 is an end-on view showing the cable positioned within the stripping blades of the apparatus of the invention shown in a closed condition.

Referring now to FIG. 1, there is shown end portions of a miniaturized coaxial cable of the type contemplated as being treated by the invention relating to the method and apparatus. The cable is shown as element 10 wiith the right-hand perspective view showing the cable 10 as terminated by a coaxial connector 50. Reference is hereby made to U.S. patent application Ser. No. 897,577, filed Aug. 18, 1986 in the name of N. R. Birch et al for a detailed teaching relative to connector 50 which is incorporated herein by reference. As can be discerned, the left-hand view of FIG. 1 is many times enlarged from the more or less scale views to the right thereof. Cable 10 can be seen to include an outer jacket comprised of a sheath 12, and outer conductor 14 of metallized plastic film or metal foil. Interiorly of conductor 14 is a dielectric core 16, and a center or signal conductor 18. Additionally included along the outside of core 16 and to the inside of foil 14 is a drain or ground wire 20 which is in contact with the inner surface of the metallized film.

To give perspective to the problem solved by the invention, with particular reference to the method and apparatus, miniaturized coaxial cable of one particular size relative to FIG. 1 includes a maximum outer diameter of 0.070 inches and a minimum outer diameter of 0.054 inches. The signal and ground conductors are 32 AWG which are approximately 0.008 inches in diameter. The outer jacket 12 is on the order of between 0.005 and 0.012 inches in thickness, and the conductor 14 is on the order of 0.001 to 0.0015 inches in thickness. A cable such as 10 can be found with outer sheaths comprised of polyvinylchloride (PVC) or Teflon material (PTFE). The conductor 14 is in a variety of forms which includes a spiral wrap or a cigarette wrap around core 16. The conductor 14 preferably includes the construction of aluminized Mylar material or aluminized Mylar material with a flash coating of copper to provide a better connection to the drain wire 20, which is typically plated with tin.

The outer sheath 12, when constructed of PVC is typically extruded over the conductor thereby covering it, and, when comprised of Teflon material, may either be spirally wrapped or extruded over the foil, depending upon the choice of the manufacturer. Cable of the type here illustrated can be found, along with reference to detailed construction through companies including Sumitomo Incorporated or Tensolite Corporation.

The dielectric core 16 as has been mentioned, is made of a material such as polyolefin or PTFE, suitably foamed or caused to have air spaces entrapped therein to achieve a relatively low dielelctric constant. With the dielectric constant of air being 1, and the dielectric constant of materials being employed today being on the order of 1.5 or even 1.3, it can be appreciated that the materials used for core 16 have very little structural strength. Additionally important to high speed signal transmission is that the core 16 have a velocity of propagation of electrical signals approaching the speed of light, and indeed materials being used today have velocities of propagation on the order of 80 percent or even 90 percent of that of air; again, because the cores are made to be comprised essentially of air in a matrix of plastic material.

This being the case, it should be understandable as to why difficulty is encountered in stripping cable such as 10 because of the relatively soft and air-like core being beneath and in effect backing up the outer layer formed by the conductor 14 and the outer sheath 12.

Referring now briefly to FIGS. 2-5, the method of the invention will be described. First, referring to FIG. 2, a side view of a cable end is shown with the various components labeled thereon. The ends of the conductors 18 and 20 can be discerned, extending very slightly from the cut end of the cable. In this regard, it is important that the end of the cable be cut smoothly and evenly in a transverse sense relative to its length, and this may be done by use of razor-type cutting action. FIG. 3 shows the end of the cable with the outer jacket including conductor 14 and outer sheath 12 removed exposing conductor 20 and core 16. It is to be noted in FIG. 3 that the process of removal of the outer jacket frequently causes the soft and fragile core 16 to be stretched axially so that the ends of the conductors 18 and 20 are no longer flush with the end of the core 16 with hole 19 occurring by such stretching.

In accordance with the invention, a further razor cut is made as indicated in FIG. 4, with segments of the core 16 and the conductors 18 and 20 removed, such segments being shown as CE for the cut end which is removed.

Next, in accordance with the invention, heat is applied as by a hot air gun suitably orificed and directed against the end of the cable which causes core 16 to shrink or retract into the position shown in FIG. 5. In practice, a temperature of 750° F. was employed in an airstream for approximately two seconds. The cable as depicted in FIG. 5 is now ready for termination, as for example in the wire manager element disclosed in U.S. patent application Ser. No. 897,577 heretofore mentioned. As the cable is axially displaced into such wire manager or into a connector, the core 16 will be compressed to effect a projection of conductors 18 and 20 to a suitable length.

It is to be understood that in accordance with the particular design of the coaxial connector, the lengths of jacket to be removed, the length of the cut end CE as shown in FIG. 4 to be removed, may be appropriately determined and accordingly, adjusted for proper length of removal.

Referring now to FIG. 6, the apparatus of the invention in the form of a stripping blade set including stripping blades 30 and 31 in a closed position with surfaces 40 and 41 abutting. The coaxial cable 10 heretofore described in FIGS. 1 through 5 is shown positioned between the blades 30 and 31 as it would be during the stripping operation. As can be discerned from FIG. 6, the stripping blades 30,31 include stripping surface 32,33. Surfaces 32,33 of blades 30 and 31 are closed when surfaces 40,41 are engaged and have a radius which is substantially less than the unrelaxed radius of the cable 10. At the outer edges of the stripping surfaces 32,33 are relief areas 34 which taper away from the radius of surfaces 32,33. The areas 34 create a relief which will accommodate the presence of the ground wire 20 should the orientation of cable 10 result in such ground wire being positioned at the relief areas 34 of the blades 30,31. By having the tapered relief areas 34, pinching, cutting or nicking of the ground wire 20 is avoided. With the invention, the ground wire 20 and thus the cable 10 can be randomly oriented in the blade set. This is particularly important for automatic cable handling and stripping.

Figure 7:
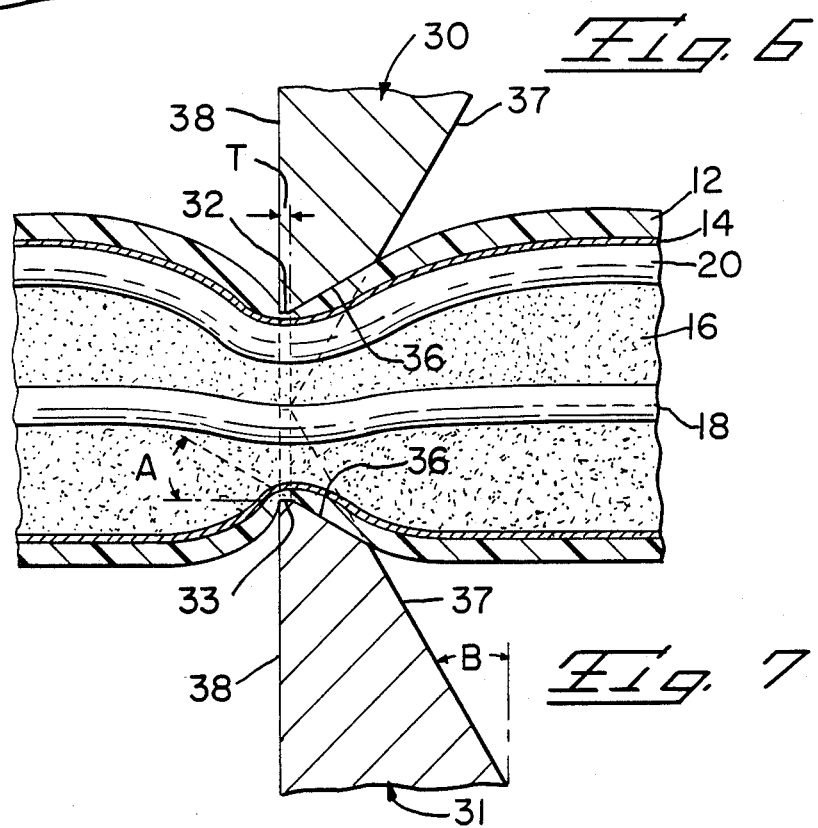
FIG. 7 is a side view of the cable and the ends of the stripping blades shown in section as an enlarged view of the elements depicted in FIG. 6.

Referring now to FIGS. 7 and 8, inner surfaces 36 will be sen to taper to surfaces 32,33.

In operation, as the stripping blades 30 and 31 are closed, the cable outer jacket 12 is considerably deformed and the core 16 is considerably compressed. In the closed position as shown in FIGS. 6 and 7, the cable 10 is then withdrawn to the right as in FIG. 8, which results in the jacket 12 and conductor 14 being severed adjacent the leading surfaces 38 of blades 30,31. At this point, the ground conductor 20 is not broken or cut or nicked, nor is the core 16. The core 16 is, however, lengthened by the tensional forces of the separation of the jacket 12 therefrom and FIG. 8 is intended to depict the initial action of such extension. As can be discerned, the core 16 has pulled away from the center conductor 18 leaving hole 19 as heretofore discussed. In accordance with the invention, it has been discovered that by making surfaces 32,33 dull rather than sharp in accordance with the prior art practice relative to stripping blades, jackets such as comprised of the sheath 12 and the conductor 14 heretofore described may be reliably removed from cable constructions having cores as described. The term "dull" as herein used relates to surfaces 32,33 having a thickness T of between 0.001 to 0.002 inches or 25 to 50 microns. This compares with a usual practice relative to razor-sharp edges employed in many stripping tools of a thickness on the order of 0.0001 and 0.0002 inches or 3 to 5 microns.

As can be discerned from FIGS. 7 and 8, the blades 30 and 31 have an outer surface 38 which is perpendicular to the longitudinal axis of the cable as inserted, and an inner tapered surface 36 leading from the thickness T which is at an angle A. This tapered surface 36 serves as a relief to create volume, allowing flow of the cable material away from the crushing or pinching surfaces 32,33. Tapered surfaces 36 of blades 30,31 merge into tapered surfaces 37 which are at an angle B with respect to a vertical plane parallel to surfaces 38. (See FIG. 7). Angle B is also 30 degrees. In an actual embodiment of the tool, the angles A and B were made to be on the order of 30 degrees, it being understood that a few degrees more or less can be tolerated as long as an adequate volume is provided. FIGS. 9 and 10 shown surface 36 of stripping blade 31 which of course is the same for stripping blade 30.

Referring back to FIG. 2, the cable 10 is shown preparatory to stripping and the cable is shown in FIG. 3 following stripping, utilizing the method and blades of the invention. While not shown, it is to be understood that the blades 30 and 31 may be employed in any straight action tool, hand operated or air or electric operated. Reference is made to U.S. Pat. No. 3,191,464 to H. W. Demler, which shows a straight action mechanism suitable for use with stripping blades 30,31. In this regard, it may be advisable to provide a stop to prevent the blades from being overdriven. In such case, the stop could be provided via the offset flats 44 and 45 in FIG. 6. In such event, these surfaces would be made to bottom upon a piece of metal, stock or shim. In general, one or the other of the blades may be fixed and the opposite blade driven in movement to effect closure.

In an actual embodiment, the blades were 0.330 inches thick and made of AISI A2 tool steel, suitably heat treated to a hardness of 50-55 Rockwell. The blades wre machined to provide a ground surface texture. The blades and method of the invention were employed in samples of a variety of cables having outer sheaths of both Teflon and PVC material overcovering a polyester film suitably metallized, in turn overcovering in certain instances a foamed Teflon core or a polyolefin core 16, all with a consistent and satisfactory stripping operation; namely, stripping without damage to the ground conductor or the core itself.

Worth mentioning in this regard was the fact that with certain cables, the outer sheath 12 was found to be bonded as by adhesive or other means to the conductor 14. In such event, stripping took place straightforwardly. In other cases, the outer sheath 12 was found to be unbonded to the conductor 14, leaving to less than satisfactory stripping results on a number of cables. It was found that by exposing the end of the cable to a jet of hot heated air at approximately 750 degrees Fahrenheit, a bonding of jacket 12 to conductor 14 resulted and that following such bonding, stripping was found to be quite satisfactory. This occurred with cable having an outer sheath 12 comprised of PVC material.

Having now disclosed the foregoing invention with the intention to enable its practice, claims intended to define what is inventive are now set forth.

I claim:

1. In a method for stripping miniaturized coaxial cable of a type having a central signal conductor surrounded by a soft and porous foam dielectric core, in turn surrounded by a protective jacket including a ground conductor, disposed between the outside of said core and the inside of said jacket, the steps comprising:
   a. placing the cable between a set of stripping blades having dulled stripping surfaces and adapted to close on said cable and including a rounded geometry of a diameter substantially less than the relaxed diameter of said cable;
   b. closing said stripping blades on said cable to tightly clamp said jacket therebetween;
   c. pulling said cable to tear said jacket from said core at said stripping blades and removing the cut end of said jacket from said cable;
   d. cutting the end of said core and conductors to provide a proper length of the stripped end of said cable; and
   e. heating the end of said core to effect a shrinking thereof exposing a projection of said central signal conductor relative to the end of said core.

2. In a method for stripping miniaturized coaxial cable of a type having a central signal conductor surrounded by soft and porous foam dielectric core, in turn surrounded by a protective jacket including a metallized film with at least one ground conductor disposed between the outer surface of said core and the conductive surface of said film, the steps comprising:
   a. placing the cable within stripping surfaces of a set of stripping blades having a rounded geometry which when closed clamps said jacket around the periphery thereof with the said stripping surfaces of said blades being relatively dull and terminating at a point of closure between said blades in a relieved portion intended to accommodate the said ground conductor in an orientation thereof, placing said ground conductor at the point of closure of said blades;
   b. closing said stripping blades upon said cable to clamp and pinch said jacket;
   c. pulling said cable to tear said jacket anmd metallized film at said stripping blades; and
   d. removing portions of said jacket and metallized film from said cable exposing said core and said conductors for use in termination of said cable.

3. In a method for stripping coaxial cable of a type having a central signal conductor surrounded by soft and porous foam dielectric material in the form of a core, in turn surrounded by a protective jacket including a film having a conductive surface and a ground conductor in contact with said conductive surface, the steps comprising:
   a. placing the cable between a set of stripping blades, each blade including a stripping surface having a flat surface thereon between one and two thousandths of an inch in thickness, wherein one surface of each bladeis perpendicualr to the longitudinal axis of a cable to be stripped and the other surface of each blade tapers away from said flat surface to provide volumetric relief relative to cable material;
   b. closing said stripping surfaces, the balde on the cable jacket to clamp said jacket therein;
   c. pulling said cable to tear said jacket and said film from said core along an area defined by said one surface; and
   d. removing the torn portion of said jacket and film to expose said core and said conductors for subsequent use in a coaxial connector.

4. As an article of manufacture, a set of cable stripping blades for stripping coaxial cable, said blades being adapted to be driven together in a common axis of closure by a straight action tool, said blades including flat edge sections adapted to mate and limit travel thereof, said blades further including between said flat sections a rounded surface including a flat portion on the order of between one and two thousandths of an inch and of a geometry such that when said blades are closed, said surfaces substantially deform the cable to be stripped and pinch the outer jacket thereof between said flat portions, said blades further including proximate the ends thereof a relief area such that when said blades are closed, a volume is left to accommodate the presence of ground wires in said cable.

5. The blades of claim 4 wherein each blade includes a first surface leading from said one flat edge sections which lies in a common plane parallel to the axis of closure at a second surface leading from a second edge section in a plane at an angle to said axis of closure to provide volumetric relief for said cable as clamped between said blades.

* * * * *